(12) United States Patent
Muth et al.

(10) Patent No.: US 10,391,807 B2
(45) Date of Patent: Aug. 27, 2019

(54) POLYMER LAMINATE FOR A SECURITY AND/OR VALUABLE DOCUMENT AND METHOD FOR THE PRODUCTION THEREOF

(75) Inventors: Oliver Muth, Berlin (DE); Manfred Paeschke, Wandlitz (DE); Arthur Mathea, Berlin (DE); André Leopold, Berlin (DE); Jörg Fischer, Berlin (DE); Malte Pflughoefft, Berlin (DE); Heinz Pudleiner, Krefeld (DE)

(73) Assignees: Bundesdruckerei GmbH, Berlin (DE); Bayer MaterialScience AG, Leverkusen (DE)

( * ) Notice: Subject to any disclaimer, the term of this patent is extended or adjusted under 35 U.S.C. 154(b) by 486 days.

(21) Appl. No.: 12/740,740

(22) PCT Filed: Oct. 31, 2008

(86) PCT No.: PCT/EP2008/009336
§ 371 (c)(1),
(2), (4) Date: Jul. 29, 2010

(87) PCT Pub. No.: WO2009/056352
PCT Pub. Date: May 7, 2009

(65) Prior Publication Data
US 2010/0295290 A1    Nov. 25, 2010

(30) Foreign Application Priority Data

Oct. 31, 2007 (DE) .......... 10 2007 052 947
Dec. 7, 2007 (DE) .......... 10 2007 059 747
Feb. 29, 2008 (DE) .......... 10 2008 012 419

(51) Int. Cl.
B42D 25/47 (2014.01)
B32B 7/03 (2019.01)
(Continued)

(52) U.S. Cl.
CPC ............. B42D 25/47 (2014.10); B32B 3/02 (2013.01); B32B 7/03 (2019.01); B32B 7/10 (2013.01);
(Continued)

(58) Field of Classification Search
CPC .......... B42D 1/00; B42D 19/00; B42D 25/00; B42D 25/30; B42D 25/41; B42D 25/45;
(Continued)

(56) References Cited

U.S. PATENT DOCUMENTS 2,970,131 A   1/1961 Moyer, Jr. et al.
2,991,273 A   7/1961 Hechelhammer et al.
(Continued)

FOREIGN PATENT DOCUMENTS

AU   8766582 A    3/1983
CA   2244018 A1   2/1999
(Continued)

OTHER PUBLICATIONS

Schnell, H., "Chemistry and Physics of Polycarbonates" Interscience Publishers, A Division of John Wiley & Sons, New York, 1964, pp. 27-98.
(Continued)

*Primary Examiner* — Justin V Lewis
(74) *Attorney, Agent, or Firm* — Laurence A. Greenberg; Werner H. Stemer; Ralph E. Locher

(57) ABSTRACT

In order to create novel security features in secure and/or valuable documents, a polymer layer composite, which has at least two polymer layers that are bonded to each other in a material fit is provided. At least one surface is printed with an absorbing printed layer within a visible region in and/or on the composite located on a polymer layer of the composite. The absorbing printed layer forms at least one printed region, and all printed regions of the printed surface of the
(Continued)

polymer layer have a total surface area of at least 50% and not more than 95%.

17 Claims, 4 Drawing Sheets

(51) Int. Cl.

| | | |
|---|---|---|
| *B42D 25/351* | (2014.01) | |
| *B42D 25/333* | (2014.01) | |
| *B32B 27/06* | (2006.01) | |
| *B32B 38/00* | (2006.01) | |
| *B41M 3/14* | (2006.01) | |
| *B42D 25/41* | (2014.01) | |
| *B42D 25/00* | (2014.01) | |
| *B32B 7/10* | (2006.01) | |
| *B32B 27/08* | (2006.01) | |
| *B32B 27/20* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *B32B 3/02* | (2006.01) | |
| *B42D 25/309* | (2014.01) | |
| *B42D 25/45* | (2014.01) | |
| *B42D 25/455* | (2014.01) | |

(52) U.S. Cl.
CPC .............. *B32B 27/06* (2013.01); *B32B 27/08* (2013.01); *B32B 27/20* (2013.01); *B32B 27/281* (2013.01); *B32B 27/30* (2013.01); *B32B 27/304* (2013.01); *B32B 27/32* (2013.01); *B32B 27/36* (2013.01); *B32B 27/365* (2013.01); *B32B 27/40* (2013.01); *B32B 38/145* (2013.01); *B41M 3/14* (2013.01); *B41M 3/148* (2013.01); *B42D 25/00* (2014.10); *B42D 25/333* (2014.10); *B42D 25/351* (2014.10); *B42D 25/41* (2014.10); *B32B 2255/10* (2013.01); *B32B 2307/412* (2013.01); *B32B 2307/414* (2013.01); *B32B 2307/75* (2013.01); *B32B 2425/00* (2013.01); *B32B 2429/00* (2013.01); *B32B 2581/00* (2013.01); *B42D 25/309* (2014.10); *B42D 25/45* (2014.10); *B42D 25/455* (2014.10); *B42D 2033/20* (2013.01); *B42D 2035/06* (2013.01); *B42D 2035/12* (2013.01); *B42D 2035/16* (2013.01); *Y10T 428/24802* (2015.01)

(58) Field of Classification Search
CPC ............... B42D 25/455; B42D 25/309; B42D 2033/20; B42D 2035/16; B42D 2035/06; B42D 2035/12; B41M 3/14; B41M 3/148; B32B 27/365; B32B 27/32; B32B 7/005; B32B 27/08; B32B 27/281; B32B 27/40; B32B 27/36; B32B 3/02; B32B 27/20; B32B 27/304; B32B 27/30; B32B 7/10; B32B 38/145; B32B 2255/10; B32B 2307/414; B32B 2429/00; B32B 2581/00; B32B 2307/412; B32B 2307/75; B32B 2425/00; B32B 27/06; Y10T 428/24802
USPC ........ 281/2, 5; 283/72, 94, 98, 107, 109, 74, 283/75, 101, 108, 110
See application file for complete search history.

(56) References Cited

U.S. PATENT DOCUMENTS

| | | | |
|---|---|---|---|
| 2,999,835 | A | 9/1961 | Goldberg |
| 2,999,846 | A | 9/1961 | Schnell et al. |
| 3,028,365 | A | 4/1962 | Schnell et al. |
| 3,062,781 | A | 11/1962 | Bottenbruch et al. |
| 3,148,172 | A | 9/1964 | Fox |
| 3,271,367 | A | 9/1966 | Schnell et al. |
| 3,275,601 | A | 9/1966 | Schnell et al. |
| 3,536,894 | A | 10/1970 | Travioli |
| 3,755,935 | A | 9/1973 | Annenberg |
| 3,758,970 | A | 9/1973 | Annenberg |
| 3,827,726 | A | 8/1974 | McVoy et al. |
| 3,836,754 | A | 9/1974 | Toye et al. |
| 4,298,217 | A * | 11/1981 | Moraw ................. B42D 25/00 283/108 |
| 4,500,116 | A * | 2/1985 | Ferro ................... B42D 25/415 283/92 |
| 4,536,016 | A | 8/1985 | Solomon et al. |
| 5,380,695 | A * | 1/1995 | Chiang ..................... B41M 3/14 283/109 |
| 5,618,630 | A | 4/1997 | Benoit et al. |
| 6,022,429 | A | 2/2000 | Hagstrom |
| 6,264,296 | B1 | 7/2001 | Klinefelter et al. |
| 6,685,312 | B2 | 2/2004 | Klinefelter et al. |
| 6,932,527 | B2 | 8/2005 | Pribula et al. |
| 6,979,141 | B2 | 12/2005 | Karst et al. |
| 7,037,013 | B2 | 5/2006 | Klinefelter et al. |
| 7,070,112 | B2 | 7/2006 | Beenau et al. |
| 7,078,090 | B2 | 7/2006 | Tompkin et al. |
| 7,220,479 | B2 | 5/2007 | Lutz et al. |
| 7,366,301 | B2 | 4/2008 | Huang et al. |
| 7,468,842 | B2 * | 12/2008 | Steenblik ............... B42D 25/29 283/72 |
| 7,832,771 | B2 | 11/2010 | Hoeppner et al. |
| 8,333,870 | B2 | 12/2012 | Burchard et al. |
| 2002/0008380 | A1 | 1/2002 | Taylor et al. |
| 2002/0113430 | A1* | 8/2002 | Beghello ............. B42D 25/355 283/83 |
| 2003/0017312 | A1 | 1/2003 | Labrousse et al. |
| 2005/0035590 | A1* | 2/2005 | Jones ..................... B42D 25/00 283/74 |
| 2005/0095408 | A1 | 5/2005 | LaBrec et al. |
| 2005/0186416 | A1* | 8/2005 | Sebastian et al. ............ 428/343 |
| 2006/0151989 | A1* | 7/2006 | Muke ...................... B41M 1/24 283/67 |
| 2006/0197337 | A1* | 9/2006 | Merry .................... B42D 25/00 283/109 |
| 2006/0249951 | A1* | 11/2006 | Cruikshank ........... B42D 25/29 283/92 |
| 2007/0102920 | A1 | 5/2007 | Bi et al. |
| 2007/0297211 | A1 | 12/2007 | Ehreke et al. |
| 2008/0224462 | A1* | 9/2008 | Dubner et al. .................. 283/75 |
| 2008/0224463 | A1* | 9/2008 | Egli ........................ B41M 5/26 283/86 |

FOREIGN PATENT DOCUMENTS

| | | | |
|---|---|---|---|
| DE | 1570703 | A1 | 2/1970 |
| DE | 2063050 | A1 | 7/1972 |
| DE | 2063052 | A1 | 7/1972 |
| DE | 2211956 | A1 | 10/1973 |
| DE | 3832396 | A1 | 2/1990 |
| DE | 10064616 | A1 | 7/2002 |
| DE | 102004008840 | A1 | 9/2005 |
| DE | 102004023301 | A1 | 12/2005 |
| DE | 60018222 | T2 | 1/2006 |
| EP | 0011684 | B1 | 2/1983 |
| EP | 0086282 | A1 | 8/1983 |
| EP | 0343310 | A1 | 11/1989 |
| EP | 0430282 | A2 | 6/1991 |
| EP | 0896260 | A2 | 2/1999 |
| EP | 0916519 | A1 | 5/1999 |
| EP | 1222620 | B1 | 11/2005 |
| EP | 1355784 | B1 | 3/2006 |
| EP | 1640156 | A1 | 3/2006 |

(56) References Cited

FOREIGN PATENT DOCUMENTS

| | | |
|---|---|---|
| EP | 1431062 B1 | 2/2007 |
| EP | 1509404 B1 | 8/2007 |
| FR | 1561518 A | 3/1969 |
| GB | 1122003 A | 7/1968 |
| GB | 1229482 A | 4/1971 |
| GB | 1341318 A | 12/1973 |
| GB | 1367788 A | 9/1974 |
| GB | 1367790 A | 9/1974 |
| GB | 2067467 A | 7/1981 |
| WO | 9600146 A1 | 1/1996 |
| WO | 0015430 A1 | 3/2000 |
| WO | 0245008 A2 | 6/2002 |
| WO | 2004028825 A2 | 4/2004 |
| WO | 2005091085 A1 | 9/2005 |
| WO | 2006133512 A1 | 12/2006 |

OTHER PUBLICATIONS

Booth et al., "Dyes, General Survey", Ullmann's Encyclopedia of Industrial Chemistry (UEIC), 2002 by Wiley-VCH Verlag GmbH & CO., pp. 1-61.

Hunger et al., "Pigments, Organic", Ullmann's Encyclopedia of Industrial Chemistry (UEIC), 2002 by Wiley-VCH Verlag GmbH & CO., pp. 1-66.

Voelz, H., "Pigments Inorganic, 1. General", Ullmann's Encyclopedia of Industrial Chemistry (UEIC) 2000 by Wiley-VCH Verlag GmbH & CO., pp. 1-38.

Auer et al., "Pigments, Inorganic, 2. White Pigments" Ullmann's Encyclopedia of Industrial Chemistry (UEIC), 2009 by Wiley-VCH Verlag GmbH & CO., pp. 1-40.

Buxbaum et al., "Pigments, Inorganic, 3. Colored Pigments", Ullmann's Encyclopedia of Industrial Chemistry (UEIC), 2009 by Wiley-VCH Verlag GmbH & CO., pp. 1-49.

Leitner et al., "Pigments, Inorganic, 4. Magnetic Pigments", Ullmann's Encyclopedia of Industrial Chemistry (UEIC), 2009 by Wiley-VCH Verlag GmbH & CO., pp. 1-8.

Etzrodt, G., "Pigments, Inorganic, 5. Anticorrosive Pigments", Ullmann's Encyclopedia of Industrial Chemistry (UEIC), 2009 by Wiley-VCH Verlag GmbH & CO., pp. 1-22.

Pfaff et al., "Pigments, Inorganic, 6. Luster Pigments", Ullmann's Encyclopedia of Industrial Chemistry (UEIC), 2009 by Wiley-VCH Verlag GmbH & CO., pp. 1-17.

Gaedcke, H., "Pigments Inorganic, 7. Transparent Pigments", Ullmann's Encyclopedia of Industrial Chemistry (UEIC), 2009 by Wiley-VCH Verlag GmbH & CO., pp. 1-5.

Winkelmann et al., "Imaging Technology", Ullmann's Encyclopedia of Industrial Chemistry (UEIC), 2003 by Wiley-VCH Verlag GmbH & CO., pp. 1-116.

Stove et al., "Paints and Coatings", Ullmann's Encyclopedia of Industrial Chemistry (UEIC), 2008 by Wiley-VCH Verlag GmbH & CO., pp. 1-216.

Van Renesse, "Optical Document Security" 3rd Edition, Artech House, 2005 pp. 1-366.

\* cited by examiner

POLYMER LAMINATE FOR A SECURITY AND/OR VALUABLE DOCUMENT AND METHOD FOR THE PRODUCTION THEREOF

BACKGROUND OF THE INVENTION

Field of the Invention

The present invention relates to a polymer laminate for a security and/or valuable document, a method for the production thereof, a security and/or valuable document which can be produced from the polymer laminate according to the invention and the use of the security and/or valuable document as a passport, personal identification document, driver's license, ID card, credit card, bank card, cash payment card, store card or visa card.

Card-like data carriers serve, for example, for identifying persons and/or articles and/or for cashless payment. They have, inter alia, visually recognizable features which assign them unambiguously to a person and/or an article and/or a cash or security account and permit only the owner to identify himself or to use the article or the account and to initiate cash transfers. For this reason, these data carriers must have security features which make it practically impossible for unauthorized persons to forge or to tamper with the cards, so that misuse can be practically eliminated. Moreover, a forgery is thus also easily recognizable.

For protection from forgery or tampering, a multiplicity of different security features have been proposed and also realized to date for the known card-like data carriers, for example guilloches, watermarks, embossed marks, transmitted light register marks, identity pictures produced by laser engraving, holograms, multistable figures, fluorescent marks and various other features. These features are intended to make forgery more difficult or even practically impossible. For this purpose, it should be extremely difficult to reproduce these features.

Substantial security features in the card-like data carriers are personalized and/or individualized features which are stored in the data carrier. Personalized features are, for example, identity pictures and data of the person to whom the card is assigned, for example the date of birth, the address or identification number in a company and biometric data, such as a digitized data record of fingerprints, or the height, eye color of the person or the latter's membership of a health insurance company. Individualized features are data which are assigned to a certain facility, such as, for example, a motor vehicle, bank account or a security.

Such personalized and/or individualized features are applied individually to the card-like data carriers for the person who uses them. The method for production thereof must therefore be flexible. For example, methods and apparatuses for applying such data to card-like data carriers are described in U.S. Pat. Nos. 6,022,429 A, 6,264,296 B1, 6,685,312 B2, 6,932,527 B2, 6,979,141 B1 and 7,037,013 B2, the disclosure content of which is hereby incorporated in its entirety into the disclosure content of this description, it being possible for the personalized and/or individualized features to be applied to the cards, inter alia, by means of inkjet printing technology. In some of the abovementioned documents, it is also stated that these data are covered with a protective film (overlay film) after application.

Furthermore, the companies issuing the cards also attempt to present esthetically appealing cards. For this purpose, there have been many attempts in the past to produce a transparent card which meets the requirements.

For example, EP 1 222 620 B1 describes a card which is substantially transparent to visible light, has at least one transparent or translucent card surface and contains a material which is recognizable by a card reader, absorbs in the infrared range and is transparent to visible light, so that an activation sensor in the card reader is activated independently of the point at which the sensor is opposite the card surface. The infrared materials may be applied, for example, by a printing process to the card surface.

Furthermore, WO 02/45008 A2 describes a non-opaque plastic card which, as in the case of EP 1 222 620 B1, likewise contains an infrared-absorbing layer. U.S. Pat. No. 7,070,112 B2 also describes a transparent card.

For the coding of data in a card, U.S. Pat. No. 3,536,894 states that holes are punched into an inner layer of the card, through which infrared radiation can pass. For example, a thin cellophane film which is transparent to visible radiation but opaque to infrared radiation can be used for this purpose. The pattern of the holes corresponds to information.

U.S. Pat. No. 3,836,754 furthermore describes a translucent card which is used, for example, for opening doors. This card contains, in an inner film, certain regions in which the transparency for light is different from the transparency for light in another region. For this purpose, holes can be punched in the inner film or dark spots of printing ink can be applied to the inner film. The position of the holes or spots codes for information.

However, in the case of holes in an inner film, it has been found that these holes are mapped on the outside in the laminated card since the regions in which the holes are present collapse on lamination. However, this is a serious disadvantage for the esthetic appearance of the card.

High-quality card-like data carriers nowadays consist in particular of polycarbonate. Personalization and/or individualization of polycarbonate-based cards typically takes place by laser engraving. In this procedure, a laser beam is focused into the material and guided over the material. The laser beam produces, in the interior, by pyrolysis, blackened regions which differ in intensity in the respective areas, depending on laser intensity and duration. Thus, an image or another graphic or an inscription or a number and/or letter combination can be produced. However, it is not possible by this method to produce colored images or graphics and character or number sequences but only black/white representations. However, it is also possible to a certain extent to produce gray shades/steps. There has therefore been no lack of further attempts to produce colored representations by means of printing techniques in the cards. However, this has proved to be problematic since the usable printing inks are not sufficiently suitable for the design of the cards. This is because a color print produced on a polymer film leads, on subsequent combination, for example lamination, of this film with further films, in the case of inner print, to, now and then, the situation where the laminated or otherwise combined film stack thus produced can possibly be delaminated or split again by manipulation in the layer of the laminate in which the print layer is arranged. Depending on the nature of the ink, there are incompatibilities which manifest themselves in the form of poor adhesion. In particular, water-based inks can easily be scratched off layers (strata) which may consist of different polymers, for example polyolefins, polyesters, polycarbonates, and can therefore present problems even before joining. Such a weakness in the security and/or valuable document is, however, unacceptable since forgery of or tampering with the document is facilitated thereby.

BRIEF SUMMARY OF THE INVENTION

The present invention is therefore initially based on the problem that a laminate with personalized and/or individualized features which have been produced by printing can possibly be delaminated or split by unauthorized manipulations, so that it is desirable to find a method by means of which this is reliably prevented.

In addition, there has been no lack of attempts in the past to find methods which are suitable for creating novel security features which are present in a polymer laminate, especially one based on polycarbonate. It is therefore a further object of the present invention to find novel security features for security and/or valuable documents, for which forgery or tampering is practically ruled out.

Where the term "pattern" is used in the description of the invention and in the claims, it is to be understood as meaning a print reproduction which is structured in any manner and represents personalized and/or individualized information or non-personalized and/or non-individualized information. Inter alia, regular patterns, for example a background screen, guilloches or characters, in particular alphanumeric characters, or a one-dimensional or two-dimensional barcode or an emblem, logo, coats of arms, national emblems or seals are suitable as a structured print reproduction of non-personalized and/or non-individualized information.

Where the term "personalized" is used in the description of the invention and in the claims, it is to be understood as meaning information which relates to a person, for example the owner of the data carrier. For the sake of simplicity, however, this term is also intended to include the term "individualized" below and in the claims. The latter relates to information which is assigned to a certain facility, such as, for example, a motor vehicle, a bank account or a security.

Where the term "extensive print region" is used in the description of the invention and in the claims, it is to be understood as meaning a surface region on a polymer layer which is covered by a print layer, in particular so that the printing ink is applied without free print regions being present therein. This means that, apart from color changes or density changes during print application, no structures are detectable in the print layer at least on viewing with the naked eye. In other words, the printing ink is printed as a solid area on the surface. In the case of screenprinting techniques, the dots are present at all screen points.

Where the term "digital printing process" is used in the description and in the claims, it is to be understood as meaning a printing process in which the data required for image production are digitized and, for printing, are used directly, as in the case of the inkjet printing process, or indirectly, as in the case of a xerographic printing process, for producing the printed image, without an explicit printing plate being required. This is a non-impact-printing process, i.e. a process in which no solid printing plate (a printing cylinder or a stamp) is used.

Where the term "absorbing" is used in the description and in the claims, it is to be understood as meaning the attenuation of the transmission of light. An absorbing printing ink may therefore also have diffusely or directionally reflecting properties. Absorbing printing inks therefore comprise colored absorbing printing inks, white scattering printing inks and metallic reflective printing inks.

For producing novel forgery- and tamper-proof security features, according to the invention a polymer laminate is proposed for a security and/or valuable document, for example for a passport, personal identification document, driver's license, an ID card, credit card, bank card, cash payment card, store card or visa card, which has at least two polymer layers materially bonded to one another. The format of these documents is preferably ID-1, ID-2 or ID-3. In and/or on the laminate, at least one surface printed with a print layer absorbing in the visible range is present on a polymer layer of the laminate. The absorbing print layer forms at least one print region, all print regions on this surface of the polymer layer together having a proportion by area of at least 50% and not more than 95% of the surface. The reference variable for the proportion by area is therefore the total surface area of one side of a polymer layer.

Such a polymer laminate is produced, according to the invention, using the following steps of the method: (a) provision of at least two polymer layers; (b) printing of at least one surface on one of the polymer layers with at least one print layer absorbing in the visible range, the absorbing print layer forming at least one print region, all print regions on this surface of the polymer layer together having a proportion by area of at least 50% and not more than 95%; and (c) stacking and material bonding of the polymer layers.

Preferably, the print regions on the printed surface form at least one cohesive extensive print region, optionally 2, 3, 4, 5, 6 or n cohesive print regions, n being an integer from 7 to, for example, 100.

The starting point of the present invention is the discovery that novel security features can be produced in security and/or valuable documents if an inner surface in a security and/or valuable document is printed in a relatively large proportion by area of the total surface without it being possible to delaminate or split this document. It has in fact been found that a security and/or valuable document in which a print layer is applied to an inner layer can be easily delaminated or split because the print layer acts as a release layer. Such documents can therefore also be relatively easily forged or tampered with. This disadvantage can occur particularly when the print layer forms at least a cohesive extensive print region. The formation of patterns by a print layer forming in particular cohesive extensive print regions is a security feature. According to the invention, a proportion by area of the print of at least 50%, preferably at least 60%, more preferably at least 65%, even more preferably at least 70% and most preferably at least 75% can be provided.

In order also to be able, without destroying the document, to recognize from outside whether the opaque surface present in the laminate is formed by a print layer and not, for example, by an opaque polymer layer, a proportion by area of the printed surface of not more than 95%, preferably not more than 90% and most preferably not more than 85% is provided. If an opaque inner polymer layer were to be used instead of a print layer, the outer layers would collapse at those points of the laminate where those free regions, for example punched-out regions, are present in the opaque layer. It is true that transparent or translucent materials could be inserted in the areas where the free regions are present, for example transparent film pieces or a transparent polymer in liquid form which, for example, cures on lamination. However, in this case too, these manipulations will appear on the card surface as uneven areas which will be caused by the inhomogeneous material distribution in the environment of the transparent regions.

Thus, a print on an inner surface can make it possible to detect from the outside that the document has been produced according to the invention by a printing technique. The design according to the invention is therefore a security feature.

There are therefore regions on the unprinted surface which together have a proportion by area on the surface of <50%, preferably <40%, more preferably <35%, even more preferably <30% and most preferably <25%. Furthermore, the total proportion by area of these free surface regions is >5%, preferably >10% and most preferably >15%. Thus, the total proportion by area of the unprinted surface may be from 5% to 50%.

The present invention relates to a laminate comprising polymer layers which may optionally additionally contain layers of other materials, for example of board, paper, textiles, woven fabrics, knitted fabrics or so-called prepregs, for producing security and/or valuable documents.

In principle, all materials customary in the area of security and/or valuable documents can be used as materials for the polymer layers. These layers are preferably 50-300 μm thick. The polymer layers can be formed, identically or differently, on the basis of a polymer material from the group consisting of PC (polycarbonate, in particular bisphenol A polycarbonate), PET (polyethylene glycol terephthalate), PMMA (polymethyl methacrylate), TPU (thermoplastic polyurethane elastomers), PE (polyethylene), PP (polypropylene), PI (polyimide or poly-trans-isoprene), PVC (polyvinyl chloride) and copolymers of such polymers. Furthermore, coextruded films of these materials can be used. The use of PC materials is preferred, it also being possible for example, but by no means necessarily, to use so-called low-$T_g$ polycarbonate-based materials, in particular for a polymer layer on which a print layer is applied and/or for a polymer layer which is bonded to a polymer layer which carries a print layer, in particular on the side with the print layer. Low-$T_g$ materials are polymers whose glass transition temperature is below 140° C.

The polymer layers may be used in filled or unfilled form. The filled polymer layers contain in particular colored pigments or other fillers. The polymer layers may also be colored with dyes or may be colorless and transparent, translucent or opaque. Preferably, at least the polymer layers which are present above the printed surfaces are transparent.

It is preferable if the base polymer of at least one of the polymer layers to be bonded contains identical or different groups which are reactive with one another, reactive groups of a first polymer layer reacting with one another and/or with reactive groups of a second polymer layer at a lamination temperature of less than 200° C. As a result, the lamination temperature can be reduced without the intimate bonding of the laminated layers being endangered thereby. In the case of different polymer layers having reactive groups, this is due to the fact that the different polymer layers can no longer be readily delaminated, owing to the reaction of the respective reactive groups. This is because reactive coupling takes place between the polymer layers, equivalent to reactive lamination. Furthermore, owing to the lower lamination temperature, it becomes possible to prevent a change in a colored print layer, in particular a color change. It is advantageous if the glass transition temperature $T_g$ of the at least one polymer layer is less than 120° C. (or less than 110° C. or less than 100° C.) before the thermal lamination, the glass transition temperature of this polymer layer after the thermal lamination by reaction of reactive groups of the base polymer of the polymer layer with one another being at least 5° C., preferably at least 20° C., higher than the glass transition temperature before the thermal lamination. It is not only reactive coupling of the layers to be laminated with one another that occurs thereby. Rather, the molecular weight and hence the glass transition temperature are increased by crosslinking of the polymer within the layer and between the layers. This makes it even more difficult to effect delamination since, for example, the printing inks are irreversibly damaged in particular in an attempt at manipulation by the high delamination temperatures required, and the document is destroyed thereby. Preferably, the lamination temperature with the use of such polymer materials is less than 180° C., preferably less than 150° C. The choice of the suitable reactive groups is possible without problems for a person skilled in the art in the area of polymer chemistry. Exemplary reactive groups are selected from the group consisting of —CN, —OCN, —NCO, —NC, —SH, —S$_x$, -Tos, —SCN, —NCS, —H, -epoxy (—CHOCH$_2$), —NH$_2$, —NN$^+$, —NN—R, —OH, —COOH, —CHO, —COOR, -Hal (—F, —Cl, —Br, —I), -Me-Hal (Me=at least divalent metal, for example Mg), —Si(OR)$_3$, —SiHal$_3$, —CH=CH$_2$ and —COR", where R" may be any desired reactive or unreactive group, for example H, Hal, C$_1$-C$_{20}$-alkyl, C$_3$-C$_{20}$-aryl, C$_4$-C$_{20}$-aralkyl, in each case branched or straight-chain, saturated or unsaturated, optionally substituted, or corresponding heterocycles having one or more identical or different heteroatoms N, O or S. Other reactive groups are of course possible. These include the reactants of the Diels-Alder reaction or of a metathesis.

The reactive groups can be directly bonded to the base polymer or can be bonded via a spacer group to the base polymer. Suitable spacer groups are all spacer groups known to the person skilled in the art for polymer chemistry. The spacer groups may also be oligomers or polymers which impart resilience, with the result that the danger of breakage of the security and/or valuable document is reduced. Such resilience-imparting spacer groups are known to the person skilled in the art and therefore need not be described further here. Spacer groups which are selected from the group consisting of —(CH$_2$)$_n$—, —(CH$_2$—CH$_2$—O)$_n$—, —(SiR$_2$—O)$_n$—, —(C$_6$H$_4$)$_n$—, —(C$_6$H$_{10}$)$_n$—, —C$_1$-C$_n$-alkylene-, —C$_3$-C$_{(n+3)}$-arylene-, —C$_4$-C$_{(n+4)}$-aralkylene-, in each case branched or straight-chain, saturated or unsaturated, optionally substituted, or corresponding heterocycles having one or more, identical or different heteroatoms O, N or S, where n=from 1 to 20, preferably from 1 to 10, may be mentioned merely by way of example. Regarding further reactive groups or possibilities for modification, reference is made to "Ullmann's Encyclopedia of Industrial Chemistry", Wiley Publishers, electronic release 2006. In the context of the above statements, the definition of the base polymer designates a polymer structure which carries no groups reactive under the lamination conditions used. Said polymer structure may be homopolymers or copolymers. With regard to said polymers, modified polymers are also included.

The present invention serves for producing security features in security and/or valuable documents. Preferably, free surface regions in which the surface is not printed and which are in the form of windows are present on the surface which is provided with the print layer and on which the proportion by area of the print layer may be from 50 to 95%. Such windows may have any desired shape and may be, for example, rectangular or square. Furthermore, the border of the printed surface on the polymer layer, for example a narrow border a few millimeters wide, preferably 0.5-5 mm wide, more preferably 1-3 mm wide, may form a free surface region in which the surface is not printed. Furthermore, free surface regions in which the surface is not printed and which together form information, for example personalized information, may be present on the printed surface on the polymer layer. Very particularly preferably, this personalized information may be a passport photo. Furthermore, free surface regions in which the surface is not printed and which together form at least one pattern, for example an emblem, coat of arms, national emblem, logo or seal, may be present on the printed surface on the polymer layer. There is therefore a multiplicity of possible variants for the shaping of the free surface regions, provided that the abovementioned condition relating to proportion by area is fulfilled. Other embodiments, for example regular background patterns with which the free surface regions are structured, are of course also conceivable.

In a preferred embodiment of the invention, not only is a printed surface with the proportion by area according to the invention provided but two such printed surfaces are provided, for example the two surfaces of a polymer layer. The two surfaces can very particularly preferably be printed in the same surface regions so that the opacity in the printed areas is higher than if only one surface were to be printed.

The printed surface on a polymer layer in the laminate can be combined with various other security features:

In a first preferred embodiment of the invention, free surface regions in which the surface, with the exception of information, is unprinted are present on the printed surface on the polymer layer. In other words, the surface is printed in such a way that information is present in the free surface regions. In the otherwise unprinted surface regions, information is thus additionally printed. Where a proportion by area of the printed area of the surface of the polymer layer is stated here, this proportion by area relates to all printed proportions by area, including the information printed on the border or in other free surface regions.

It is very particularly preferred if one of the pieces of information which are printed in one or more otherwise free surface regions is a passport photo. Instead of a passport photo, it is of course also possible to print any other information in the surface regions, for example other personalized information. It is more preferable if the surface region is in the form of a window and the window has the outer contour of the information, preferably of a passport photo. Instead of fitting a passport photo into a window, it is of course also possible to fit any other information or a pattern, for example an emblem, coat of arms, seal, national emblem, a barcode which carries personalized information, or a logo, or a character sequence, for example an alphanumeric character sequence, into a window.

In this first embodiment, the information, which likewise represents a security feature, is present on the surface which is printed according to the condition according to the invention which relates to the proportion by area, and preferably cohesively and extensively. This information can be printed in particular in a window. Instead of a print in a window, it is of course also possible to produce a print on the border of the surface which forms a free surface region.

In a second preferred embodiment of the invention, the printed surface is present on a first polymer layer. Furthermore, at least one piece of information is present on at least one secondary polymer layer and/or on further polymer layers. This information is present on the second layer and/or on these further layers in each case in a surface region. These surface regions are preferably arranged in register with the free surface region on the printed surface so that the information is visible through the free surface region on the first polymer layer.

The information on the first polymer layer, the at least one second polymer layer and/or the further polymer layers may once again be, for example, personalized information, for example a passport photo. Instead of a passport photo, it is of course also possible to provide a pattern, for example a national emblem.

Thus, the information forming a further security feature is present in this second embodiment on a polymer layer or on a plurality of polymer layers which is/are different from the polymer layer on which the surface which satisfies the condition relating to proportion by area according to the invention is present. To this extent, this embodiment differs from the first embodiment because, according to the latter embodiment, the information is present not on the printed surfaces but on one or more other surfaces.

In a particularly preferred variant of the second embodiment, the window in the print layer on the printed surface may have the outer contour of the passport photo which is printed on the at least one second polymer layer and/or on further polymer layers. As a result, the passport photo which is present, for example, behind this window can be viewed through the exactly matched frame of the window.

Alternatively, one of the pieces of information which is present on at least one second polymer layer and/or on further polymer layers may be present in the form of characters, in particular alphanumeric characters, or of a barcode.

In a combination of the first and of the second preferred embodiments of the invention, the printed surface which satisfies the condition relating to proportion by area according to the invention is present on a first polymer layer. A passport photo or other personalized and non-personalized information is produced in a surface region on surfaces on the first polymer layer and on a second polymer layer and optionally additionally on further polymer layers. The surface regions containing the passport photo or the other information on the first polymer layer, second polymer layer and optionally further polymer layers are arranged in register with the free surface region on the printed surface. Thus, the information, for example the passport photo, can be arranged both on the same polymer layer as the print layer with the high proportion by area and on further, preferably adjacent, polymer layers.

The separation of information on a plurality of surfaces on different polymer layers can be realized, for example, by the formation of different color separations or different proportions of the information on the various surfaces. For example, a passport photo can be divided into a plurality of partial images which correspond to planes of a three-dimensional representation of the original image. These partial images are then mapped in the different planes and in this way produce a plastic impression of the image.

If the information, for example personalized information, in particular a passport photo, consists of a colored representation, color separations of the information can be produced. These color separations are then printed in register with one another on different polymer layers. Such color separations are known and are based on the known color schemes, for example on the CMYK and the RGB color space. The individual color separations can, as mentioned above, be printed on different surfaces in the laminate. Preferably, these color separations are printed on the surfaces in such a way that they are in register with one another on joining and bonding of the polymer layers.

For further introduction of a security feature, when the information, for example a passport photo, has a black component in the color separation, this black component can then be produced not by a print but rather by laser engraving or by a combination of printing and laser engraving. In the latter case, the gray and black pixels of the graphic design of the passport photo or of the other information are reworked. By means of the black component, a more esthetically appealing representation is achieved. The laser engraving makes forgery or tampering substantially more difficult or even impossible. In the case of laser engraving, at least one of the polymer layers on which the black component is to be formed contains laser initiators. The black component is then formed in these polymer layers by means of a gray step laser. For this purpose, a laser beam having a suitable wavelength and intensity is directed onto those regions on the document in which the black components are to be formed. This results in pyrolysis of the polymer material which leads to the desired black ink. The material change leading to the black ink can be brought about both within the print layer (i.e. within print pixels) and above or below the print layer in the polymeric material. The laser used for this purpose is preferably an Nd:YAG laser (1064 nm), which produces or reworks the gray or black values of the graphic design (of the passport photo). In principle, any suitable radiation source having a wavelength in the range of 150-10 600 nm, in particular 150-1100 nm, can be used for the laser engraving. Alternative radiation sources to an Nd:YAG laser are, for example, $CO_2$ lasers and pulsed UV lasers (excimer lasers). The energy density is in general in a range of 0.3 $mJ/cm^2$-50 $J/cm^2$, in particular in a range of 0.3 $mJ/cm^2$-10 $J/cm^2$.

The laser-sensitive component (laser initiators) is preferably a polymer which is locally pyrolyzed by the action of the laser. The relevant polymer layer may consist of such a polymer and/or the laser-sensitive component may be a laser-sensitive pigment which is distributed in the polymer layer. Laser-sensitive pigments can be formed, for example, from organic polymers which have a high absorption of the laser radiation. Such materials are known in the area.

In a preferred variant of this embodiment, the passport photo is applied to an outer surface of the polymer laminate so that, after lamination of the laminate with an overlay film, it is present inside the laminate. In this case, the passport photo may be arranged on a translucent film which may contain the laser initiators for the formation or enhancement of the black component of the passport photo. The overlay film is preferably transparent. Different color separations of the passport photo can be arranged, for example, both on an outer surface of the polymer laminate and on the inside of the overlay film or only on the outer surface of the laminate or only on the inside of the overlay film. Further color separations may also be printed on surfaces further inside the laminate.

In a third preferred embodiment of the invention, at least one free surface region which is in the form of a window is present on the printed surface on a first polymer layer, and a display element, for example an LCD display, is present on the first polymer layer or on a second polymer layer in a surface region which is arranged in register with the window on the first polymer layer. In this embodiment, an electronic circuit which serves for actuating the display element may be concealed under a cohesively extensive print layer. To prevent this circuit from being visible also from the back of the card, a third surface, for example the back of the second polymer layer or a surface on a third polymer layer on that side of the second polymer layer which faces away from the first polymer layer can be printed in a solid area with an opaque ink, or the second polymer layer or the third polymer layer is itself opaque.

In principle, a polymer laminate which contains at least two polymer layers having printed surfaces on which cohesive extensive print regions are formed, which in each case cover at least 50% of the printed surface, may be provided for such designs of the security and/or valuable document. In this case, it is in fact possible to provide, between the two surfaces, an electric circuit which comprises, for example, at least one computer chip and an antenna circuit (embedded or incorporated by lamination). Such electric circuits are suitable for the contactless transmission of information from and to the chip in the radio frequency range (RFID). For such applications, no display element is usually provided. The data transmission from and to the chip serves, for example, for identifying the person or a facility or for exchanging data. If a window is provided in at least one of the print layers on the polymer layers of the laminate, said window may serve, for example, for receiving a passport photo or any other information or merely as a security feature per se.

In a fourth preferred embodiment of the invention, at least one free surface region which is in the form of a window is present on the printed surface of a first polymer layer, and the first polymer layer or a second polymer layer is formed, at least in one surface region which is arranged in register with the window on the first polymer layer, as a polarization filter. Such polarization filters are known to the person skilled in the art, and the corresponding materials are also available, inter alia, as films. If all polymer layers which are present in the completely laminated laminate behind and in front of the polarization filter, including the first polymer layer, if this does not form the polarization filter, are transparent, an article arranged behind this window is visible in altered form. This too is a further security feature.

In a fifth embodiment of the invention, a free surface region which is in the form of a window is present on the printed surface of a first polymer layer, and a first partial image is present on a second polymer layer on one side of the first polymer layer in the laminate, and a second partial image is present on a third polymer layer on the other side of the first polymer layer in the laminate. These partial images are present in surface regions which are arranged in register with the window, the first partial image and the second partial image together giving a total image. Such a transmitted light register mark is likewise a security feature. For example, the total image may be an alphanumeric character. The free region of the first polymer layer is preferably translucent. This results in a transmitted light register mark which shows only the partial symbol in each case when the document is viewed in plan view and shows the total symbol only on viewing with backlighting.

Furthermore, it is of course possible for the translucent window not to be placed between the two partial images. Instead, it is possible, for example, to place a transparent window on one side of the transmitted light register mark, and the two partial images of the total image are present on one and the same side of the window, once again separated by a translucent film. The partial images may be present on the same translucent film in that the front and back are printed, or on different films, for example one partial image on the translucent film and another on a transparent film, or both partial images on in each case a transparent film, separated by a translucent film.

The formation of such a transmitted light register mark has the advantage that such an element, which always requires a translucent film, can be placed on a document having an inlay, consisting, for example, of chip and antenna. In the prior art, these two properties cannot be combined with one another if it is desired to make the chip and the antenna invisible in transmitted light. This is because a strictly opaque layer which forms or covers the inlay is required for this purpose. A transmitted light register mark as described above can therefore be formed in such a way that a transparent or translucent film is provided with opaque print and the translucent film is formed at a point where neither chip nor antenna is present.

It is therefore also possible to ensure that a free surface region which is in the form of a window is present on the printed surface of a first polymer layer, and that a first partial image is present on a first surface in the laminate and a second partial image is present in surface regions which are arranged in register with the window on a second surface in the laminate, the first partial image and the second partial image together giving a total image, and at least one translucent polymer layer being present between the first surface and the second surface.

It is of course also possible to individualize and/or personalize transmitted light register marks. In one embodiment, a static, extensive, at least monochrome pattern is printed on a film. This pattern is enclosed by two translucent films. The printing can be effected on an inside of one of these translucent films or on a third film which is present between these two films. In each case an individualized window is present on these translucent films, directly or in a layer on top, and the remainder is opaque. In transmitted light, the "average" is seen, i.e. the common free constituents of the window. In this way, it is possible, for example, to introduce initials or the like.

A further embodiment ensures that the first window on one side consists of a free, for example rectangular or square, shape and next to it a letter which represents a part of the initials of the document owner. The second window on the other side likewise consists of a rectangular or square shape and next to it a letter which represents the second part of the initials of the document owner. The second rectangle/square is placed in the second window so that it is present above the letter of the first window. The first rectangle/square in the first window is placed so that it is present above the second letter of the initials in the second window. At least one translucent film, which, for example, may be developed as a film laminate as in the first case (translucent films include a printed layer), is present between these two windows. However, it is also possible to use only one translucent film which is printed on both sides with an at least monochrome pattern, in particular in such a way that the printing on each side is effected only where a letter field, i.e. not the rectangle/square, is subsequently provided on this side. In the case of "Erika Mustermann" with the initials "EM", printing would therefore be carried out in the "E" field on one side and in the "M" field on the other side. Through the windows above, when the document is viewed in plan view, the "E" is seen from one side and the "M" from the other side, and the initials "EM" are only recognized in transmitted light from one side, and likewise from the other side, but as a mirror image.

In principle, it is of course also possible in further embodiments of the invention to combine other security features, for example, with a window which is formed on a surface on one of the polymer layers of the laminate by otherwise whole-area printing on this surface. For example, a hologram or a multistable figure can be formed on the outside of the security or valuable document and a window which is arranged in register with the region of the hologram or multistable figure can be formed on an inner surface of a polymer layer of the laminate.

Simple individualization of a hologram is also possible in this way. For this purpose, for example, a volume hologram may be formed as a simple hologram of a diffusion screen, as described, for example, in EP 0 896 260 A. The introduction can be effected, for example, according to WO 2005/091085 A. The individualization is effected via individual printing of a film which is present on top and is printed with an individual window. Of course, any other hologram, kinegram, zero-order grating, etc., can be used instead of the hologram of a diffusion screen. In general, this individualization function can also be used for any other security features, such as luminescences (fluorescence, phosphorescence, up-conversion), photochromic inks, thermochromic inks, microprints, etc., i.e. for the whole spectrum of optical features, structural features or substance features which are detected through the window, with the naked eye, with mechanical aids and the naked eye or completely mechanically.

In a sixth preferred embodiment of the invention, the contours of the free surface regions or of only one free surface region or of only a few free surface regions are formed by a microprint. Thus, for example, the window can be delimited with respect to the surface print by a microprint. A further security feature is introduced into the document thereby. Moreover, the contour of the free surface region is blurred by the microprint. This imparts an additional esthetic stimulus to the graphic representation of the card.

In a seventh preferred embodiment of the invention, at least one cohesive extensive print region may be formed. At least a part of the extensive print region can be formed by partial print regions of different density in the form of a watermark. For example, at least one surface on a first polymer layer can be printed with the print layer with formation of at least one window. In this case, the watermark is formed on a second polymer layer. For this purpose, a print layer is formed in a surface region on the second polymer layer, which is arranged in register with the window on the first polymer layer and has partial print regions of different densities and in the form of a watermark.

Alternatively, the watermark may also be formed by two printed surfaces. In each case an extensive print region is provided on the two surfaces. One of the two extensive print regions has free surface regions, for example in the form of a pattern or in the form of personalized information, for example of a passport photo, so that the cooperation of a first surface of the two cohesively and extensively printed surfaces and of the second surface of the two printed surfaces, which has the free surface regions, results in a watermark. This is produced by the different overall density of the two print layers when the document is viewed with backlighting.

Other security features can also be introduced into the polymer laminate without a direct relationship with the design of the printed surface having the proportion by area according to the invention, for example holograms, multistable figures, guilloches, transmitted light register marks, passport photos, fluorescent markers, watermarks, etc. These further security features may extend over the entire surface or over only a part of the surface.

It is particularly advantageous if one polymer layer, a few polymer layers or all polymer layers in the laminate are transparent. This results in a particularly appealing esthetic appearance of the document. Furthermore, this also makes it possible for the information which is arranged, for example, in a window or on a border of the document to be visible and optionally to be visible from both sides of the document. Alternatively, one polymer layer, a few polymer layers or all polymer layers in the laminate may also be translucent.

The print layers which are printed on one or more surfaces in the laminate, optionally also in a cohesive and extensive manner, can be formed, for example, by means of a digital printing technique. This is expedient in particular when personalized data are to be formed in the document, because such printing techniques can be used in a very flexible manner. The inkjet printing technique is particularly preferred. Alternatively, conventional printing techniques can also be used, for example letterpress printing (direct or indirect), lithographic printing (offset printing, wet printing, waterless printing), screenprinting and in particular intaglio printing and halftone gravioprinting. For the production of personalized information, inkjet printing is likewise preferred because it can be used in a flexible manner, for example with a resolution of at least 300 dpi, at least 8, in particular 16, more preferably 64 and most preferably 256 gray steps being provided, so that photographic quality results.

The print layer which is printed on one or more surfaces in the laminate, optionally in a cohesive and extensive manner, may be in particular white.

In order to achieve a completely opaque print layer which allows through no light even when the document is viewed with backlighting, a silver ink can be printed underneath the print layer. Such silver inks are specified by relevant ISO standards. This silver layer can be printed, as in the case of the print layer consisting, for example, of white ink, by means of a digital printing technique, for example the inkjet printing technique. This print is limited to the print regions (in which the print layer is formed). The silver ink moreover increases the absorption of infrared radiation or of NIR radiation.

As already stated above, it is advantageous if the respective print layers in the polymer laminate are arranged on inner layers of the laminate. In this case, forgery of or tampering with print layers serving as security features is difficult or even ruled out.

However, there is in this case the further problem mentioned at the outset that conventional card-like data carriers can be relatively easily delaminated by manipulation. The problem of delamination where a security feature is applied by printing processes to an inner layer of the laminate can be solved if the print layers contain binders which at least substantially comprise the same polymer as the material of the layers of the laminate. In this case, the danger of delamination is practically ruled out because a monolithic laminate of the individual layers forms on lamination. It is particularly preferable if the print layers contain polycarbonate-based binders and if one layer, a few layers or all layers of the laminate likewise consist of polycarbonate. In the latter case, the print layers are printed on inner layers of the laminate, in particular all layers of the laminate which are adjacent to the print layers being formed from polycarbonate.

The printing ink used, for example a CMY printing ink, is preferably solvent-based. The ink preferably superficially dissolves the polymer layer. The solvent is removed by a drying process after printing. The printing ink is thus preferably incorporated a few μm to 15 μm into the polymer layer. Furthermore, nanoscale pigments in the form of metal oxides can be incorporated into the print layer. As a result, volume drying instead of surface drying is permitted if drying is effected by means of IR radiation.

In principle, all inks customary in the field can be used for printing on polycarbonate laminates. The use of a preparation containing: A) from 0.1 to 20% by weight of a binder comprising a polycarbonate derivative, B) from 30 to 99.9% by weight of a preferably organic solvent or solvent mixture, C) from 0 to 10% by weight of a colorant or colorant mixture (% by weight, based on the dry mass thereof), D) from 0 to 10% by weight of a functional material or of a mixture of functional materials, E) from 0 to 30% by weight of additives and/or auxiliaries or of a mixture of such substances, the sum of the components A) to E) always being 100% by weight, as a printing ink is preferred. Such polycarbonate derivatives are highly compatible with polycarbonate materials, in particular polycarbonates based on bisphenol A, such as, for example, Makrofol® films. In addition, the polycarbonate derivative used is stable to high temperatures and shows no discolorations at all at temperatures up to 200° C. or more which are typical for lamination, with the result that use of the low-$T_g$ materials described above is also unnecessary. Specifically, the polycarbonate derivative may contain functional carbonate structural units of the formula (I)

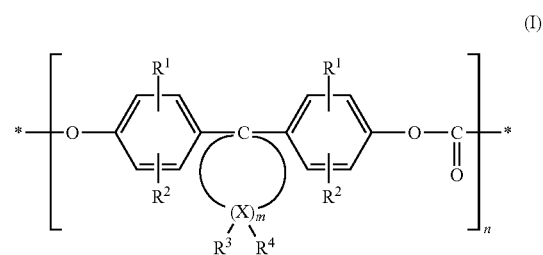

in which $R^1$ and $R^2$, independently of one another, are hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl;

m is an integer from 4 to 7, preferably 4 or 5; $R^3$ and $R^4$, selectable for each X individually, are, independently of one another, hydrogen or $C_1$-$C_6$-alkyl; X is carbon and n is an integer greater than 20, with the proviso that $R^3$ and $R^4$ are simultaneously alkyl on at least one X atom. It is preferable if $R^3$ and $R^4$ are simultaneously alkyl on one or two X atoms, in particular only on one X atom. $R^3$ and $R^4$ may be in particular methyl. The X atoms in the α-position to the diphenyl-substituted C atom (C1) cannot be dialkyl-substituted. The X atoms in the β-position to C1 may be disubstituted by alkyl. Preferably, m is 4 or 5. The polycarbonate derivative may be formed, for example, on the basis of monomers such as 4,4'-(3,3,5-trimethylcyclohexane-1,1-diyl)diphenol, 4,4'-(3,3-dimethylcyclohexane-1,1-diyl)diphenol or 4,4'-(2,4,4-trimethylcyclopentane-1,1-diyl)diphenol. Such a polycarbonate derivative can be prepared, for example, according to the literature reference DE-A 38 32 396 from diphenols of the formula (Ia), the disclosure content of which is hereby incorporated in its entirety into the disclosure content of this description. It is possible to use either one diphenol of the formula (Ia) with formation of homopolycarbonates or a plurality of diphenols of the formula (Ia) with formation of copolycarbonates (meaning of radicals, groups and parameters as in formula I).

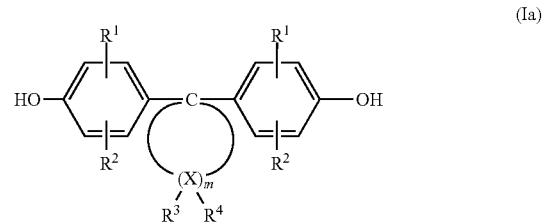

In addition, the diphenols of the formula (Ia) may also be used as a mixture with other diphenols, for example with those of the formula (Ib)

for the preparation of high molecular weight, thermoplastic, aromatic polycarbonate derivatives.

Suitable other diphenols of the formula (Ib) are those in which Z is an aromatic radical having 6 to 30 C atoms, which may contain one or more aromatic nuclei, may be substituted and may contain aliphatic radicals or cycloaliphatic radicals other than those of the formula (Ia) or heteroatoms as bridge members. Examples of the diphenols of the formula (Ib) are hydroquinone, resorcinol, dihydroxybiphenyls, bis(hydroxyphenyl)-alkanes, bis(hydroxyphenyl) cycloalkanes, bis(hydroxyphenyl) sulfides, bis(hydroxyphenyl) ethers, bis(hydroxyphenyl) ketones, bis (hydroxyphenyl) sulfones, bis(hydroxyphenyl) sulfoxides, α,α'-bis(hydroxyphenyl)diisopropylbenzenes and the compounds thereof which are alkylated on the nucleus and halogenated on the nucleus. These and further suitable diphenols are described, for example, in U.S. Pat. Nos. 3,028,365, 2,999,835, 3,148,172, 3,275,601, 2,991,273, 3,271,367, 3,062,781, 2,970,131, 2,999,846, DE-A 1 570 703, DE-A 2 063 050, DE-A 2 063 052, DE-A 2 211 956, FR-A 1 561 518 and in H. Schnell in: *Chemistry and physics of polycarbonates*, Interscience Publishers, New York 1964, the disclosure content of which is hereby incorporated in its entirety into the disclosure content of the present description. Examples of preferred other diphenols are: 4,4'-dihydroxybiphenyl, 2,2-bis(4-hydroxyphenyl)propane, 2,4-bis (4-hydroxyphenyl)-2-methylbutane, 1,1-bis(4-hydroxyphenyl)cyclohexane, α,α'-bis(4-hydroxyphenyl)-p-diisopropylbenzene, 2,2-bis(3-methyl-4-hydroxyphenyl) propane, 2,2-bis(3-chloro-4-hydroxyphenyl)propane, bis(3, 5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,1-bis(3,5-dimethyl-4-hydroxyphenyl)cyclohexane, α,α'-bis(3,5-dimethyl-4-hydroxyphenyl)-α-diisopropylbenzene, 2,2-bis(3,5-dichloro-4-hydroxyphenyl)propane and 2,2-bis(3,5-dibromo-4-hydroxyphenyl)propane. Particularly preferred diphenols of the formula (Ib) are, for example, 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane and 1,1-bis(4-hydroxyphenyl)cyclohexane. In particular, 2,2-bis (4-hydroxyphenyl)propane is preferred. The other diphenols can be used either individually or as a mixture. The molar ratio of diphenols of the formula (Ia) to the other diphenols of the formula (Ib) which are optionally to be concomitantly used should be from 100 mol % of (Ia): 0 mol % (Ib) to 2 mol % of (Ia): 98 mol % (Ib), preferably from 100 mol % of (Ia): 0 mol % (Ib) to 10 mol % (Ia): 90 mol % (Ib) and in particular from 100 mol % of (Ia): 0 mol % (Ib) to 30 mol % of (Ia): 70 mol % (Ib). The high molecular weight polycarbonate derivatives obtained from the diphenols of the formula (Ia), optionally in combination with other diphenols, can be prepared by the known polycarbonate preparation processes. The various diphenols can be linked to one another either randomly or blockwise. The polycarbonate derivatives used may be branched in a manner known per se. If branching is desired, this can be achieved in a known manner by incorporation of small amounts, preferably of amounts of from 0.05 to 2.0 mol % (based on diphenols used), of compounds which are trifunctional or more than trifunctional, in particular those having three or more than three phenolic hydroxyl groups, by condensation. Some branching agents having three or more than three phenolic hydroxyl groups are phloroglucinol, 4,6-dimethyl-2,4,6-tri (4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl) phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane, hexa[4-(4-hydroxyphenylisopropyl)phenyl]-ortho-terephthalic acid ester, tetra(4-hydroxyphenyl)methane, tetra[4-(4-hydroxyphenylisopropyl)phenoxy]methane and 1,4-bis[4',4"-dihydroxytriphenyl)methyl]benzene. Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole. Monofunctional compounds in customary concentrations are used as chain stoppers for regulation, known per se, of the molecular weight of the polycarbonate derivatives. Suitable compounds are, for example, phenol, tert-butylphenols or other alkyl-substituted phenols. For regulating the molecular weight, in particular small amounts of phenols of the formula (Ic) are suitable

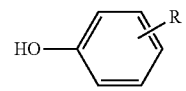

in which R is a branched $C_8$- and/or $C_9$-alkyl radical. Preferably, in the alkyl radical R, the proportion of $CH_3$ protons is from 47 to 89% and the proportion of CH and $CH_2$ protons is from 53 to 11%; it is also preferable if R is in the o- and/or p-position to the OH group and particularly preferred if the upper limit of the ortho proportion is 20%. The chain stoppers are generally used in amounts of from 0.5 to 10, preferably from 1.5 to 8 mol %, based on diphenols used. The polycarbonate derivatives can be prepared in a manner known per se, preferably according to the phase boundary behavior (cf. H. Schnell in: *Chemistry and Physics of Polycarbonates*, Polymer Reviews, Vol. IX, page 33 et seq., Interscience Publ. 1964). In this procedure, the diphenols of the formula (Ia) are dissolved in the aqueous alkaline phase. For the preparation of copolycarbonates with other diphenols, mixtures of diphenols of the formula (Ia) and the other diphenols, for example those of the formula (Ib), are used. Chain stoppers, for example of the formula (Ic), can be added for regulating the molecular weight. The reaction is then effected in the presence of an inert, preferably polycarbonate-dissolving, organic phase with phosgene by the phase boundary condensation method. The reaction temperature is in the range from 0° C. to 40° C. The optionally concomitantly used branching agents (preferably from 0.05 to 2.0 mol %) can either be initially introduced with the diphenols in the aqueous alkaline phase or can be added in solution in the organic solvent before the phosgenation. In addition to the diphenols of the formula (Ia) and optionally other diphenols (Ib), the mono- and/or bischlorocarbonic acid esters thereof can also be concomitantly used, these being added in solution in organic solvents. The amount of chain stoppers and of branching agents then depends on the molar amount of diphenolate radicals according to formula (Ia) and optionally formula (Ib); with the concomitant use of chlorocarbonic acid esters, the amount of phosgene can be reduced appropriately in a known manner. Suitable organic solvents for the chain stoppers and optionally for the branching agents and the chlorocarbonic acid esters are, for example, methylene chloride, chlorobenzene and in particular mixtures of methylene chloride and chlorobenzene. Optionally, the chain stoppers and branching agents used can be dissolved in the same solvent. For example, methylene chloride, chlorobenzene and mixtures of methylene chloride and chlorobenzene serve as the organic phase for the phase boundary polycondensation. For example, NaOH solution serves as the aqueous alkaline phase. The preparation of the polycarbonate derivatives by the phase boundary process can be catalyzed in a customary manner by catalysts such as tertiary amines, in particular tertiary aliphatic amines, such as tributylamine or triethylamine; the catalysts can be used in amounts of from 0.05 to 10 mol %, based on moles of diphenols used. The catalysts can be added before the beginning of the phosgenation or during or even after the phosgenation. The polycarbonate derivatives can be prepared by known processes in the homogeneous phase, the so-called "pyridine process", and by the known melt transesterification process with the use of, for example, diphenyl carbonate instead of phosgene. The polycarbonate derivatives may be straight-chain or branched; they are homopolycarbonates or copolycarbonates based on diphenols of the formula (Ia). As a result of the arbitrary composition comprising other diphenols, in particular comprising those of the formula (Ib), the polycarbonate properties can be varied in an advantageous manner. In such copolycarbonates, the diphenols of the formula (Ia) are present in amounts of from 100 mol % to 2 mol %, preferably in amounts of from 100 mol % to 10 mol % and in particular in amounts of from 100 mol % to 30 mol %, based on the total amount of 100 mol % of diphenol units, in polycarbonate derivatives. The polycarbonate derivative may be a copolymer containing, in particular consisting of, monomer units M1 based on the formula (Ib), preferably bisphenol A, and monomer units M2 based on geminally disubstituted dihydroxydiphenylcycloalkane, preferably on 4,4'-(3,3,5-trimethylcyclohexane-1,1-diyl)diphenol, the molar ratio M2/M1 preferably being greater than 0.3, in particular greater than 0.4, for example greater than 0.5. It is preferable if the polycarbonate derivative has an average molecular weight (weight average) of at least 10 000, preferably from 20 000 to 300 000.

The component B can in principle be substantially organic or aqueous. Here, substantially aqueous means that up to 20% by weight of the component B may be organic solvents. Substantially organic means that up to 5% by weight of water may be present in the component B. Preferably, the component B contains or consists of a liquid aliphatic, cycloaliphatic and/or aromatic hydrocarbon, a liquid organic ester and/or a mixture of such substances. The organic solvents used are preferably halogen-free organic solvents. In particular, aliphatic, cycloaliphatic, aromatic hydrocarbons, such as mesitylene, 1,2,4-trimethylbenzene, cumene and solvent naphtha, toluene, xylene, (organic) esters, such as methyl acetate, ethyl acetate, butyl acetate, methoxypropyl acetate, ethyl 3-ethoxypropionate, are suitable. Mesitylene, 1,2,4-trimethylbenzene, cumene and solvent naphtha, toluene, xylene, methyl acetate, ethyl acetate, methoxypropyl acetate and ethyl 3-ethoxypropionate are preferred. Mesitylene (1,3,5-trimethylbenzene), 1,2,4-trimethylbenzene, cumene (2-phenylpropane), solvent naphtha and ethyl 3-ethoxypropionate are very particularly preferred. A suitable solvent mixture comprises, for example, L1) from 0 to 10% by weight, preferably from 1 to 5% by weight, in particular from 2 to 3% by weight, of mesitylene, L2) from 10 to 50% by weight, preferably from 25 to 50% by weight, in particular from 30 to 40% by weight, of 1-methoxy-2-propanol acetate, L3) from 0 to 20% by weight, preferably from 1 to 20% by weight, in particular from 7 to 15% by weight, of 1,2,4-trimethylbenzene, L4) from to 50% by weight, preferably from 25 to 50% by weight, in particular from 30 to 40% by weight, of ethyl 3-ethoxypropionate, L5) from 0 to 10% by weight, preferably from 0.01 to 2% by weight, in particular from 0.05 to 0.5% by weight, of cumene and L6) from 0 to 80% by weight, preferably from 1 to 40% by weight, in particular from 15 to 25% by weight, of solvent naphtha, the sum of the components L1 to L6 always being 100% by weight.

In detail, the preparation may contain: A) from 0.1 to 10% by weight, in particular from 0.5 to 5% by weight, of a binder comprising a polycarbonate derivative based on a geminally disubstituted dihydroxydiphenylcyclo-alkane, B) from 40 to 99.9% by weight, in particular from 45 to 99.5% by weight, of an organic solvent or solvent mixture, C) from 0.1 to 6% by weight, in particular from 0.5 to 4% by weight, of a colorant or colorant mixture, D) from 0.001 to 6% by weight, in particular from 0.1 to 4% by weight, of a functional material or of a mixture of functional materials, E) from 0.1 to 30% by weight, in particular from 1 to 20% by weight, of additives and/or auxiliaries or of a mixture of such substances.

In principle, any desired colorant or colorant mixture is suitable as component C if a colorant is to be provided. All color-imparting substances are designated as colorants. This means that they may be both dyes (an overview of dyes is given in Ullmann's Encyclopedia of Industrial Chemistry, Electronic Release 2007, Wiley publishers, chapter "Dyes, General Survey") and pigments (an overview of organic as well as inorganic pigments is given in Ullmann's Encyclopedia of Industrial Chemistry, Electronic Release 2007, Wiley publishers, chapter "Pigments, Organic" and "Pigments, Inorganic"). Dyes should be soluble or dispersible (in a stable manner) or suspendable in the solvents of component B. Furthermore, it is advantageous if the colorant is stable, in particular color-stable, at temperatures of 160° C. or more for a period of more then 5 min. It is also possible for the colorant to be subjected to a predetermined and reproducible color change under the processing conditions and to be chosen accordingly. In addition to having thermal stability, pigments must be present in particular in very finely divided particle size distribution. For inkjet printing, this means in practice that the particle size should not exceed 1.0 μm, since otherwise blockages in the printing head are the result. As a rule, nanoscale solid-state pigments and dissolved dyes have proven useful. The colorants may be cationic, anionic or neutral. The following may be mentioned merely as examples of colorants which can be used in inkjet printing: brilliant black C.I. No. 28440 (tetrasodium 4-acetamido-5-hydroxy-6-[7-sulfonato-4-(sulfophenylazo)-1-naphthylazo]naphthalene-1,7-disulfonate), chromogen black C.I. No. 14645 (3-hydroxy-4-(1-hydroxy-2-naphthylazo)-7-nitro-1-naphthalenesulfonic acid sodium salt), direct deep black E C.I. No. 30235 (disodium 4-amino-3-[[4-[(2,4-diaminophenyl)azo] [1,1-biphenyl]-4-yl]azo]-5-hydroxy-6-(phenylazo)naphthalene-2,7-disulfonate), fast black salt B C.I. No. 37245, fast black salt K C.I. No. 37190, Sudan black HB C.I. 26150 (diazo dye), naphthol black C.I. No. 20470 (diazo dye), Bayscript® black liquid (metalized azo dye), C.I. Basic Black 11, C.I. Basic Blue 154, Cartasol® Turquoise K-ZL liquid, Cartasol® Turquoise K-RL liquid (C.I. Basic Blue 140), Cartasol Blue K5R liquid. For example, the commercially available dyes Hostafine® Black TS liquid (carbon black, marketed by Clariant GmbH, Germany), Bayscript® Black liquid (C.I. mixture, marketed by Bayer AG, Germany), Cartasol® Black MG liquid (C.I. Basic Black 11, registered trademark of Clariant GmbH, Germany), Flexonylschwarz® PR 100 (E C.I. No. 30235, disodium 4-amino-3-[[4-[(2,4-diaminophenyl)azo] [1,1-biphenyl]-4-yl]azo]-5-hydroxy-6-(phenylazo)naphthalene-2, 7-disulfonate, marketed by Hoechst A G), Rhodamine B, Cartasol® Orange K3 GL (azo dye), Cartasol® Yellow K4 GL, Cartasol® K GL (azo dye) or Cartasol® Red K-3B are furthermore suitable. Furthermore, anthraquinone, azo, quinophthalone, coumarin, methine, perinone and/or pyrazole dyes, for example available under the trade name Macrolex®, can be used as soluble colorants. Further suitable colorants are described in the literature reference Ullmann's Encyclopedia of Industrial Chemistry, Electronic Release 2007, Wiley publishers, chapter "Colorants Used in Ink Jet Inks". Readily soluble colorants lead to optimal integration into the matrix or the binder of the print layer. The colorants can be added either directly as dye or pigment or as paste, a mixture of dye and pigment together with a further binder. This additional binder should be chemically compatible with the further components of the preparation. If such a paste is used as a colorant, the stated amount of component B is based on the colorant without the other components of the paste. These other components of the paste are then to be subsumed under the component E. With the use of so-called colored pigments in the scale colors cyan-magenta-yellow and preferably also (carbon) black, solid color images are possible.

The component D comprises substances which are visible directly by the human eye with the use of technical aids or visible by using suitable detectors. Here, the relevant materials known to the person skilled in the art (cf. also van Renesse in: *Optical document security*, $3^{rd}$ Ed., Artech House, 2005) which are used for protecting valuable and security documents are meant. These include luminescent substances (dyes or pigments, organic or inorganic), such as, for example, photoluminophores, electroluminophores, antistokes luminophores, fluorophores, but also magnetizable, photoacoustically addressable or piezoelectric materials. Furthermore, Raman-active or Raman-enhancing materials can be used, as can be so-called barcode materials. Here too, either the solubility of the component B or, in the case of pigmented systems, particle sizes of <1 µm and a thermal stability for temperatures >160° C. are considered as preferred criteria in the meaning of the statements on component C. Functional materials can be added directly or via a paste, i.e. a mixture with a further binder which then forms part of the component E, or with the binder used for component A.

In the case of inks for inkjet printing, the component E usually comprises established substances, such as antifoams, adjusting agents, wetting agents, surfactants, flow agents, drying agents, catalysts, (light) stabilizers, preservatives, biocides, surfactants, organic polymers for viscosity adjustment, buffer systems, etc. Suitable adjusting agents are adjusting salts customary in the field. An example of this is sodium lactate. Suitable biocides are all commercially available preservatives which are used for inks. Examples of these are Proxel® GXL (1,2-benzisothiazolin-3-one) and Parmetol® A26 (chloromethyl-/methylisothiazolone (CMI/MI) and N—/O-formals). Suitable surfactants are all commercially available surfactants which are used for inks. Amphoteric or nonionic surfactants are preferred. However, it is of course also possible to use specific anionic or cationic surfactants which do not change the properties of the dye. Examples of suitable surfactants are betaines, ethoxylated diols, etc. Examples are the product series Surfynol® (3,5-dimethyl-1-hexyn-3-ol) and Tergitol® (nonylphenol ethoxylate). Particularly when used for inkjet printing, the amount of surfactants is chosen, for example, with the proviso that the surface tension of the ink is in the range from 10 to 60 mN/m, preferably from 20 to 45 mN/m, measured at 25° C. It is possible to establish a buffer system which stabilizes the pH in the range from 2.5 to 8.5, in particular in the range from 5 to 8. Suitable buffer systems are lithium acetate, borate buffer, triethanolamine or acetic acid/sodium acetate. A buffer system is suitable in particular in the case of a substantially aqueous component B. For adjusting the viscosity of the ink, (optionally water-soluble) polymers may be provided. All polymers suitable for customary ink formulations are suitable here. Examples are water-soluble starch, in particular having an average molecular weight of from 3000 to 7000, polyvinylpyrrolidone, in particular having an average molecular weight of from 25 000 to 250 000, polyvinyl alcohol, in particular having an average molecular weight of from 10 000 to 20 000, xanthan gum, carboxymethylcellulose, ethylene oxide/propylene oxide block copolymer, in particular having an average molecular weight of from 1000 to 8000. An example of the last-mentioned block copolymer is the product series Pluronic® (block copolymers of ethylene oxide and propylene oxide). The proportion of biocide, based on the total amount of ink, may be in the range from 0 to 0.5% by weight, preferably from 0.1 to 0.3% by weight. The proportion of surfactant, based on the total amount of ink, may be in the range from 0 to 0.2% by weight. The proportion of adjusting agents, based on the total amount of ink, may be from 0 to 1% by weight, preferably from 0.1 to 0.5% by weight. The auxiliaries also include other components, such as, for example, acetic acid, formic acid or n-methylpyrrolidone, or other polymers from the dye solution or paste used. Regarding substances which are suitable as component E, reference is made in addition, for example, to Ullmann's Encyclopedia of Industrial Chemistry, Electronic Release 2007, Wiley publishers, chapter "Paints and Coatings", section "Paint Additives".

The security and/or valuable document is formed from the polymer laminate according to the invention, preferably by further lamination of overlay films (protective films) which are preferably transparent. A print formed on one or both outsides of the polymer laminate is protected thereby from abrasion and in particular forgery or tampering. A print in the form of a mirror image of a representation in the polymer laminate can additionally be applied to the inside of the overlay films, in particular so that these two representations lie in register one on top of the other after the overlay films have been placed on the laminate and bonded. Of course, the document can be formed in one step by lamination of all films which are required for a polymer laminate according to the invention and the overlay films, without first producing the polymer laminate and then laminating this with the overlay films.

Overall, the document preferably consists of eight or more layers. Under the overlay films, in each case a graphic design is preferably applied, for example by means of a printing technique, on the outside of the polymer laminate in the document. The print layer on the surface having the print region according to the invention is preferably white in order to be able readily to recognize the graphic designs.

Below, the invention is described with reference to examples which are not limiting.

BRIEF DESCRIPTION OF THE SEVERAL VIEWS OF THE DRAWING

Identical reference numerals in the figures designate in each case the same elements.

DESCRIPTION OF THE INVENTION

Figure 1:
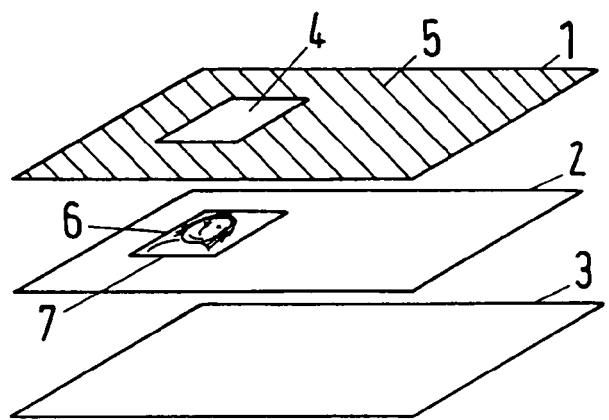
FIG. 1 shows a first polymer layer which is printed according to the invention with a print layer and in which a window is left blank, the window being arranged in register with a passport photo on a second polymer layer and a transparent third polymer layer being provided.

FIG. 1 shows a stack of a first transparent polymer layer 1 consisting of polycarbonate, a second likewise transparent polymer layer 2 consisting of polycarbonate and a likewise transparent third polymer layer 3 consisting of polycarbonate. A print layer 5 comprising a white printing ink is applied on the upper surface of the first polymer layer 1 by an inkjet printing process. A window 4 is left blank as a free surface region in this print layer 5 so that the proportion by area of the print layer 5 on the surface of the first polymer layer 1 is about 70%. On the second polymer layer 2, a passport photo 6 which is arranged in register with the window 4 on the surface of the first polymer layer 1 is printed in a surface region 7 by an inkjet printing process. As result, the passport photo 6 is visible through the window 4 after lamination of the three polymer layers 1, 2, 3. The passport photo 6 is also visible as a mirror image through the transparent third polymer layer 3 from the back of the stack.

The printing inks for the cohesive and extensive print layer 5 on the first polymer layer 1 and for the passport photo 6 on the second polymer layer 2 are prepared as follows:

Example 1: Preparation of Polycarbonate Derivatives for an Ink Composition as a Binder 149.0 g (0.65 mol) of bisphenol A (2,2-bis(4-hydroxyphenyl)propane, 107.9 g (0.35 mol) of 1,1-bis(4-hydroxyphenyl)-3,3,5-trimethylcyclohexane, 336.6 g (6 mol) of KOH and 2700 g of water are dissolved in an inert gas atmosphere with stirring. A solution of 1.88 g of phenol in 2500 ml of methylene chloride is then added. 198 g (2 mol) of phosgene are then passed into the thoroughly stirred solution at pH 13 to 14 and from 21 to 25° C. Thereafter, 1 ml of ethylpiperidine is added and stirring is effected for a further 45 min. The bisphenolate-free aqueous phase is separated off and the organic phase, after acidification with phosphoric acid, is washed neutral with water and is freed from the solvent.

The polycarbonate derivative has a relative solution viscosity of 1.263. The glass transition temperature is determined as 183° C. (DSC).

Example 2: Production of a Liquid Preparation Suitable for the Production of an Inkjet Printing Ink A liquid preparation is produced from 17.5 parts by weight of the polycarbonate derivative from Example 1 and 82.5 parts by weight of a solvent mixture according to Table I.

TABLE I

| Substance | % by weight |
| --- | --- |
| Mesitylene | 2.4 |
| 1-Methoxy-2-propanol acetate | 34.95 |
| 1,2,4-Trimethylbenzene | 10.75 |
| Ethyl 3-ethoxypropionate | 33.35 |
| Cumene | 0.105 |
| Solvent naphtha | 18.45 |

A colorless, highly viscous solution having a solution viscosity at room temperature of 800 mPa·s is obtained.

Example 3: Production of an Inkjet Printing Ink Used According to the Invention 10 g of polycarbonate solution from Example 2 and 32.5 g of the solvent mixture from Example 2 are homogenized with a magnetic stirrer in a 50 ml wide-necked glass vessel having a thread (4% strength PC solution). A colorless, low-viscosity solution having a solution viscosity at 20° C. of 5.02 mPa·s is obtained.

The polycarbonate solution obtained is additionally mixed with a white pigment for the cohesive and extensive print layer 5 on the first polymer layer 1 and with a black pigment for the passport photo 6 on the second polymer layer 2. By equivalent addition of other pigments or dyes, monochrome and/or colored inks can be produced in a corresponding manner.

Virtually no change occurs in the resolution of the pixel pattern of the passport photo printed with the ink in the joining process, in which the second polymer layer 2 printed with the pixel pattern is bonded to the first polymer layer 1 arranged on top. This means that the pixel pattern is retained in virtually the same resolution even after the lamination.

An optical investigation of the laminate shows otherwise no detectable phase boundary at all. The laminate proves to be a monolithic block which also outstandingly resists delamination attempts.

Figure 2:
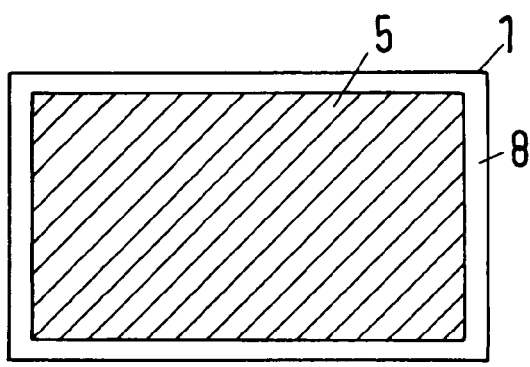
FIG. 2 shows a polymer layer which is printed according to the invention with a print layer and on which a border is left blank.

FIG. 2 shows a transparent polymer layer 1 consisting of polycarbonate and having a cohesive and extensive print layer 5, this print layer 5 covering the whole surface of the polymer layer 1 with the exception of a 3 mm wide border 8.

Figure 3:
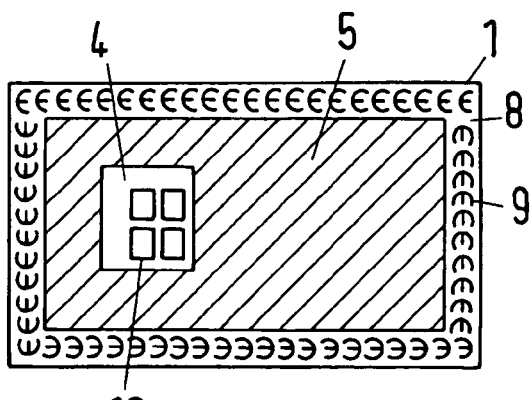
FIG. 3 shows a polymer layer which is printed according to the invention with a print layer and on which a window and a border are left free and the border is printed with characters.

FIG. 3 shows, in a further embodiment, a first transparent polymer layer 1 which consists of polycarbonate and on whose surface a print layer 5 is applied in a cohesive and extensive manner. The print layer 5 completely covers the surface of the first polymer layer 1, with the exception of a window 4 and a 7 mm wide border 8. Visible in the window 4 is a display element (LCD display) 10 which is embedded in a second polymer layer (not shown) arranged underneath and consisting of polycarbonate. The electronic circuit required for actuating the display element 10 is likewise embedded in this second polymer layer and is covered by the print layer 5 on the first polymer layer 1 so that it is not visible from the side. The second polymer layer is opaque so that the electronic circuit and the back of the display element 10 are also not visible from the back of the stack. Alphanumeric characters, for example Euro symbols, are additionally printed on the unprinted border 8.

Figure 4:
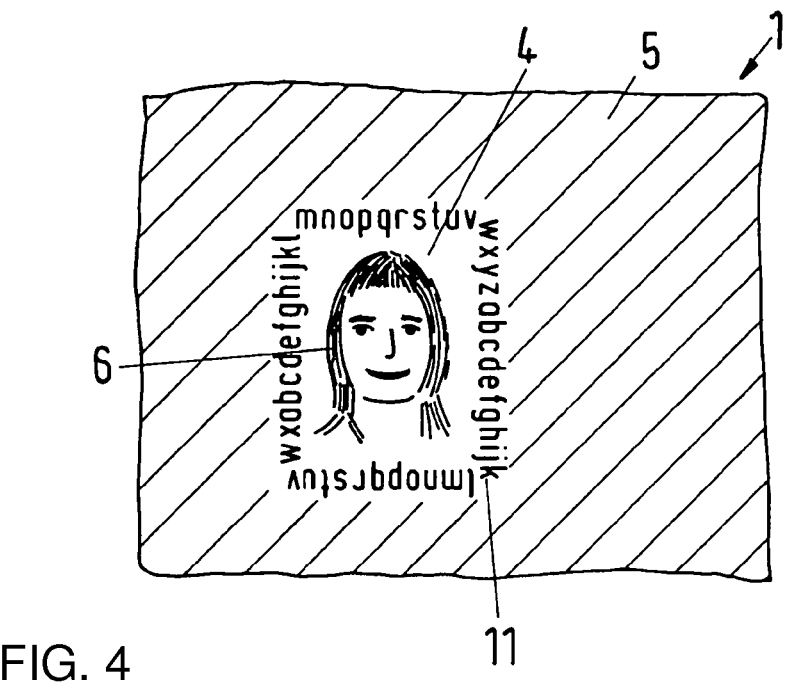
FIG. 4 shows a cut-out from a polymer layer which is printed according to the invention with a print layer on which a window is left blank and the edge of the window is formed by a microprint.

FIG. 4 shows a cut-out from a transparent polymer layer 1 printed according to the invention with a cohesive and extensive print layer 5 and consisting of polycarbonate. A window 4 in which a passport photo 6 is visible is left blank in the print layer 5. The passport photo 6 as well as the cohesive and extensive print layer 5 is applied on the polymer layer 1 shown. The window 4 is separated from the cohesive and extensive print layer 5 by a microprint 11 and forms the border of the window 4. The microprint 11 coalesces with the printed matter 5.

Figure 5:
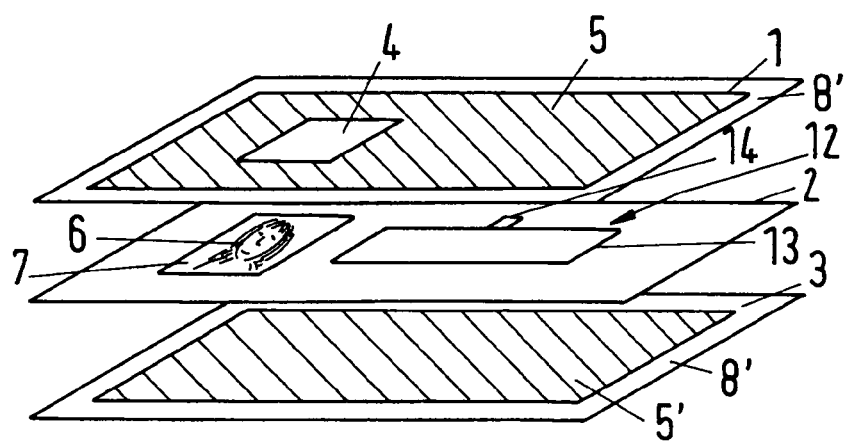
FIG. 5 shows a stack of three polymer layers with an RFID circuit and a window for a passport photo.

FIG. 5 shows, in a further embodiment of the invention, a stack of three transparent polymer layers consisting of polycarbonate, a first polymer layer 1, a second polymer layer 2 and a third polymer layer 3. A cohesive and extensive print layer 5 from which a window 4 is left blank and a border 8 remains unprinted is printed on the surface of the first polymer layer 1. A passport photo 6 is printed in a surface region 7 on the surface of the second polymer layer 2 and is arranged in register with the window 4 in the print layer 5 on the first polymer layer 1. As result, the passport photo 6 is visible through the window 4. Furthermore, an RFID circuit 12, consisting of computer chip 14 and antenna circuit 13, is also let into the second polymer layer 2. Present under the second polymer layer 2 is a third polymer layer 3 which, as in the case of the first polymer layer 1, is printed with a cohesive and extensive print layer 5'. This print layer 5' completely covers the surface of the third polymer layer 3, with the exception of a border 8'. As a result, the RFID circuit 12 present on the second polymer layer 2 is concealed and therefore not visible.

Figure 6:
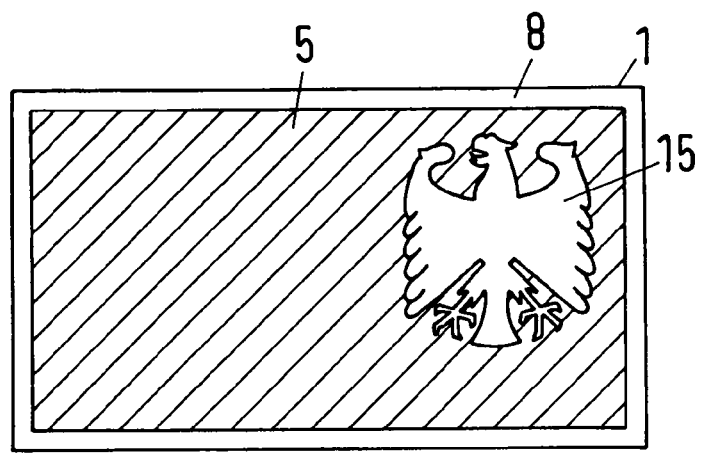
FIG. 6 shows a polymer layer having a cohesive and extensive print layer in which a free surface region in the form of a pattern is present.

FIG. 6 shows, in a further embodiment of the invention, a polymer layer 1 having a cohesive and extensive print layer 5 on one of its surfaces. However, this print layer 5 does not extend to a border 8 of the polymer layer 1. The print layer 5 also does not cover a free surface region 15 in the form of a pattern, in the present case of the eagle as a coat of arms.

Figure 7:
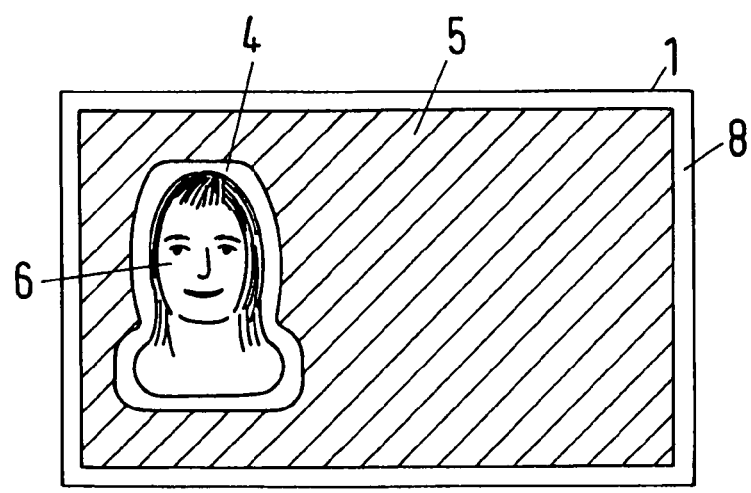
FIG. 7 shows a polymer layer having a cohesive and extensive print layer in which a window having an outer contour of a passport photo is present, the passport photo whose outer contour corresponds to the window additionally being printed on the surface of the polymer layer.

FIG. 7 shows, in a further embodiment of the invention, a polymer layer 1 having a cohesive and extensive print layer 5 on one of its surfaces. This print layer 5 does not extend to a border 8 of the polymer layer 1. In addition, a free surface region 4 in the form of a window for a passport photo 6 is left blank. The passport photo 6 is also printed on the surface of the polymer layer 1. The window 4 has the outer contour of the passport photo.

Figure 8:
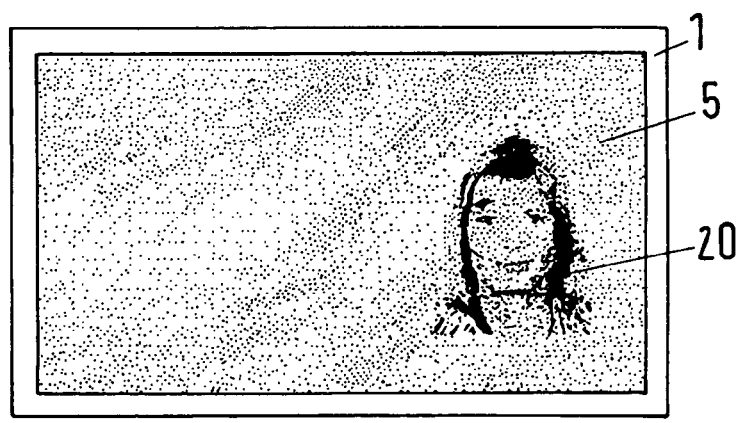
FIG. 8 shows a polymer layer having a cohesive and extensive print layer and having a print region within the extensive print layer in which a passport photo is formed as a so-called "halftone window".

FIG. 8 shows a further embodiment of the invention. A polymer layer 1 has a cohesive and extensive print layer 5 on one of its surfaces. In contrast to FIGS. 6 and 7, the free surface region is shown not only in the form of a structured space but in the form of a so-called "halftone window" 20.

In the embodiments shown so far, a rapid increase in the permeability or transparency is observable between printed and unprinted areas. In halftone representations, the window is more or less transparent and, when viewed in transmitted light, represents a sort of watermark (to date known only from paper products). If, for example, an inverted portrait is chosen as a halftone representation, the result is a plastics-based personal document in which an individualized halftone window reproduces the portrait. This is not known from the prior art since it would be much too complicated to produce films in a structured and individualized manner with more or less transparency. FIG. 8 shows the printed areas 5 in gray and the more or less transparent parts of the halftone window 16 in black.

Of course, the examples and embodiments described here serve merely for illustration and various modifications and amendments of the examples and embodiments and combinations of features described in this application are obvious to a person skilled in the art and are included within the scope of the patent claims mentioned below and incorporated into the disclosure content of the present application. All publications, patents and patent applications cited here are hereby expressly incorporated by reference into the scope of disclosure of the present application.

The invention claimed is:

1. A document, comprising:
an instrument selected from the group consisting of security documents and valuable documents, said instrument having a polymer laminate containing:
at least two polymer layers materially bonded to one another and having inner side surfaces facing each other and outer side surfaces defining an exterior of the polymer laminate, said inner side surface of one of said polymer layers being a surface having a print layer adhering onto said one polymer layer absorbing light in a visible range and resulting in said inner side surface being a printed surface, said print layer being an ink coating forming at least one print region, and all of said at least one print region on said printed surface of said one polymer layer having a proportion by area of at least 50% and not more than 95% of said printed surface, a combination of said at least two polymer layers materially bonded to one another being at least one of transparent or translucent;
said print layer being formed as one continuous image and having at least one free surface region in a form of a window disposed within said print layer and with information being printed in said at least one free surface region, said window being a free transparent or translucent surface area which is completely and continuously surrounded by said continuous image;
in an area of said at least one print region outside an area of said window, said at least two polymer layers are directly bonded to each other; and
said one polymer layer provided with said print region containing laser initiators and in that at least one piece of the information is introduced into said one polymer layer by a gray step laser.

2. The document according to claim 1, wherein said at least one print region is one of a plurality of print regions on said printed surface forming at least one cohesive and extensive print region.

3. The document according to claim 1, wherein said information includes a piece of information selected from the group consisting of characters and a barcode.

4. The document according to claim 1, wherein free surface regions in which said printed surface is not printed are present on said printed surface on said polymer layer and said free surface regions together form said information.

5. The document according to claim 1, wherein free surface regions are present on said printed surface on said polymer layer and wherein said free surface regions in said printed surface are not printed on, with an exception of said information.

6. The document according to claim 5, wherein said information includes a further piece of information in said free surface region which is a passport photo, said free surface region is in a form of said window and in that said window has an outer contour of said passport photo.

7. The document according to claim 1,
wherein said at least one free surface region which is in a form of said window is present on said printed surface on a first one of said at least two polymer layers; and
further comprising a display element disposed on one of said first or a second one of said at least two polymer layers in a surface region disposed in register with said window on said first polymer layer.

8. A document, comprising:
an instrument selected from the group consisting of security documents and valuable documents, said instrument having a polymer laminate containing:
at least two polymer layers materially bonded to one another and having inner side surfaces facing each other and outer side surfaces defining an exterior of the polymer laminate, said inner side surface of one of said polymer layers being a surface having a print layer adhering onto said one polymer layer absorbing light in a visible range and defining a printed surface, said print layer being an ink coating forming at least one print region, and all of said at least one print region on said printed surface of said polymer layer having a proportion by area of at least 50% and not more than 95% of said printed surface, a combination of said at least two polymer layers materially bonded to one another being at least one of transparent or translucent;
said print layer being formed as one continuous image and having at least one free surface region in a form of a window disposed within said print layer and with information being printed in said at least one free surface region, said window being a free transparent or translucent surface area which is completely and continuously surrounded by said continuous image; and
said print region is formed by partial print regions of different density in a form of a watermark.

9. A document, comprising:
an instrument selected from the group consisting of security documents and valuable documents, said instrument having a polymer laminate containing:
at least two polymer layers materially bonded to one another and having inner side surfaces facing each other and outer side surfaces defining an exterior of the polymer laminate, said inner side surface of one of said polymer layers being a surface having a print layer adhering onto said one polymer layer absorbing light in a visible range and defining a printed surface, said print layer being an ink coating forming at least one print region, and all of said at least one print region on said printed surface of said polymer layer having a proportion by area of at least 50% and not more than 95% of said printed surface, a combination of said at least two polymer layers materially bonded to one another being at least one of transparent or translucent;
said print layer being formed as one continuous image and having at least one free surface region in a form of a window disposed within said print layer and with information being printed in said at least one free surface region, said window being a free transparent or translucent surface area which is completely and continuously surrounded by said continuous image;
said at least two polymer layers being directly bonded to each other in an area of said at least one print region outside an area of said window; and
said print region is one of at least two extensive print regions disposed on different surfaces in said polymer laminate and one of said extensive print regions having free surface regions, resulting in a watermark.

10. A document, comprising:
an instrument selected from the group consisting of security documents and valuable documents, said instrument having a polymer laminate containing:
at least two polymer layers materially bonded to one another and having inner side surfaces facing each other and outer side surfaces defining an exterior of the polymer laminate, said inner side surface of one of said polymer layers being a surface having a print layer adhering to said one polymer layer, absorbing light in a visible range and defining a printed surface, said print layer being an ink coating and forming at least one print region defining one continuous image, and all of said at least one print region on said printed surface of said one polymer layer having a proportion by area of at least 50% and not more than 95% of said printed surface, a combination of said at least two polymer layers materially bonded to one another being at least one of transparent and translucent;
said printed surface being printed with said print layer on a first polymer layer of said at least two polymer layers and having at least one free surface region in a form of a window disposed within said printing layer and containing no printing ink or indicia, and with information being printed on and adhering to said inner side surface of a second polymer layer of said at least two polymer layers so that the information is visible through said at least one free surface region on said first polymer layer, said at least two polymer layers being directly bonded to each other in an area of said at least one print region outside an area of said window;
said window being a free transparent or translucent non-printed surface area which is completely and continuously surrounded by said continuous image; and
said second polymer layer provided with the information containing laser initiators and in that at least one piece of the information is introduced into said second polymer layer by a gray step laser.

11. The document according to claim 10, wherein said at least one print region is one of a plurality of print regions on said printed surface forming at least one cohesive and extensive print region.

12. The document according to claim 10, wherein said information includes a piece of information selected from the group consisting of characters and a barcode.

13. The document according to claim 10, wherein free surface regions in which said printed surface is not printed are present on said printed surface on said polymer layer and said free surface regions together form said information.

14. The document according to claim 10, wherein free surface regions are present on said printed surface on said polymer layer and wherein said free surface regions in said printed surface are not printed on, with an exception of said information.

15. The document according to claim 14, wherein said information includes a further piece of information in said free surface region which is a passport photo, said free surface region is in a form of said window and in that said window has an outer contour of said passport photo.

16. A document, comprising:
an instrument selected from the group consisting of security documents and valuable documents, said instrument having a polymer laminate containing:
at least two polymer layers materially bonded to one another and having inner side surfaces facing each other and outer side surfaces defining an exterior of the polymer laminate, said inner side surface of one of said polymer layers being a surface having a print layer adhering to said one polymer layer, absorbing light in a visible range and defining a printed surface, said print layer being an ink coating and forming at least one print region defining one continuous image, and all of said at least one print region on said printed surface of said one polymer layer having a proportion by area of at least 50% and not more than 95% of said printed surface, a combination of said at least two polymer layers materially bonded to one another being at least one of transparent and translucent;
said printed surface being printed with said print layer on a first polymer layer of said at least two polymer layers and having at least one free surface region in a form of a window disposed within said printing layer and containing no printing ink or indicia, and with information being printed on and adhering to said inner side surface of a second polymer layer of said at least two polymer layers so that the information is visible through said at least one free surface region on said first polymer layer, said at least two polymer layers being directly bonded to each other in an area of said at least one print region outside an area of said window;
said window being a free transparent or translucent non-printed surface area which is completely and continuously surrounded by said continuous image; and
said information printed on said inner side surface of said second polymer forms at least one cohesive extensive print region and at least a part of said cohesive extensive print region is formed by partial print regions of different density in a form of a watermark.

17. A document, comprising:
an instrument selected from the group consisting of security documents and valuable documents, said instrument having a polymer laminate containing:
at least two polymer layers materially bonded to one another and having inner side surfaces facing each other and outer side surfaces defining an exterior of the polymer laminate, said inner side surface of one of said polymer layers being a surface having a print layer adhering to said one polymer layer, absorbing light in a visible range and defining a printed surface, said print layer being an ink coating and forming at least one print region defining one continuous image, and all of said at least one print region on said printed surface of said one polymer layer having a proportion by area of at least 50% and not more than 95% of said printed surface, a combination of said at least two polymer layers materially bonded to one another being at least one of transparent and translucent;
said printed surface being printed with said print layer on a first polymer layer of said at least two polymer layers and having at least one free surface region in a form of a window disposed within said printing layer and containing no printing ink or indicia, and with information being printed on and adhering to said inner side surface of a second polymer layer of said at least two polymer layers so that the information is visible through said at least one free surface region on said first polymer layer, said at least two polymer layers being directly bonded to each other in an area of said at least one print region outside an area of said window;
said window being a free transparent or translucent non-printed surface area which is completely and continuously surrounded by said continuous image; and
said information printed on said inner side surface of said second polymer is one of at least two extensive print regions disposed on different printed surfaces in said polymer laminate and one of said extensive print regions has free surface regions, resulting in a watermark.

* * * * *